(12) United States Patent
Zachariasse

(10) Patent No.: US 8,198,641 B2
(45) Date of Patent: Jun. 12, 2012

(54) SEMICONDUCTOR DEVICE WITH BACKSIDE TAMPER PROTECTION

(75) Inventor: Frank Zachariasse, Wuchen (NL)

(73) Assignee: NXP B.V., Eindhoven (NL)

( * ) Notice: Subject to any disclaimer, the term of this patent is extended or adjusted under 35 U.S.C. 154(b) by 371 days.

(21) Appl. No.: 12/527,551

(22) PCT Filed: Feb. 13, 2008

(86) PCT No.: PCT/IB2008/050514
§ 371 (c)(1),
(2), (4) Date: Aug. 17, 2009

(87) PCT Pub. No.: WO2008/102282
PCT Pub. Date: Aug. 28, 2008

(65) Prior Publication Data
US 2010/0078636 A1 Apr. 1, 2010

(30) Foreign Application Priority Data
Feb. 20, 2007 (EP) .................................... 07102697

(51) Int. Cl.
*H01L 33/00* (2010.01)
(52) U.S. Cl. ............... 257/81; 257/80; 257/82; 257/84; 257/98; 257/100; 257/E33.058; 257/E33.068; 257/E33.076; 257/E33.077
(58) Field of Classification Search ............. 257/80, 257/81, 82, 84, 98, 99, 100, E33.058, E33.068, 257/E33.076, E33.077
See application file for complete search history.

(56) References Cited

U.S. PATENT DOCUMENTS

| 5,177,352 | A | 1/1993 | Carson et al. |
| 6,992,332 | B2 * | 1/2006 | Yamazaki et al. ............... 257/83 |
| 7,005,733 | B2 * | 2/2006 | Kommerling et al. ........ 257/679 |
| 7,408,191 | B2 * | 8/2008 | Murakami et al. ............... 257/59 |
| 2001/0033012 | A1 * | 10/2001 | Kommerling et al. ........ 257/679 |
| 2005/0161667 | A1 * | 7/2005 | Konuma .......................... 257/40 |
| 2006/0145176 | A1 * | 7/2006 | Lee ................................... 257/98 |
| 2007/0290265 | A1 * | 12/2007 | Augusto et al. ............... 257/351 |
| 2008/0251792 | A1 * | 10/2008 | Murakami et al. ............... 257/72 |
| 2011/0037061 | A1 * | 2/2011 | Yamazaki et al. ............... 257/40 |

FOREIGN PATENT DOCUMENTS
EP 1100058 A 5/2001
WO 2006117765 A2 11/2006
* cited by examiner

*Primary Examiner* — Victor A Mandala

(57) ABSTRACT

A tamper-resistant semiconductor device (5;20;30;40;50;60) which includes a plurality of electronic circuits formed on a circuitry side (6) of a substrate (7) having an opposite side which is a backside (8) of the semiconductor device, and comprises at least one light-emitting device (9a-f;21) and at least one light-sensing device (10a-f;22a-b) provided on the circuitry side (6) of the semiconductor device. The light-emitting device (9a-f;21) is arranged to emit light, including a wavelength range for which the substrate (7) is transparent, into the substrate towards the backside (8), and the light-sensing device (10a-f;22a-b) is arranged to sense at least a fraction of the emitted light following passage through the substrate (7) and reflection at the backside (8), and configured to output a signal indicative of a reflecting state of the backside, thereby enabling detection of an attempt to tamper with the backside (8) of the semiconductor device (5;20;30;40;50; 60). Through the present invention, a semiconductor device can be equipped with a backside tamper protection which neither restricts the field of application of the semiconductor device, nor the choice of packaging of the device.

18 Claims, 3 Drawing Sheets

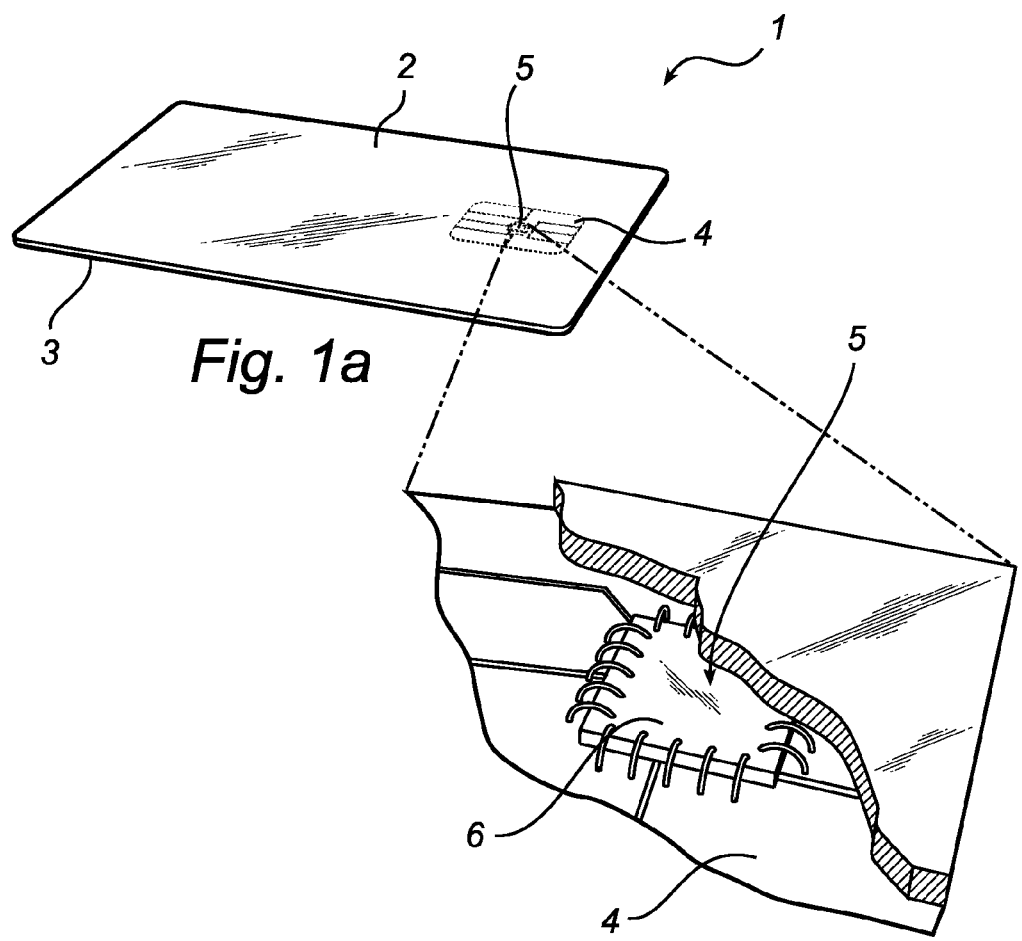
Fig. 1a
Fig. 1b
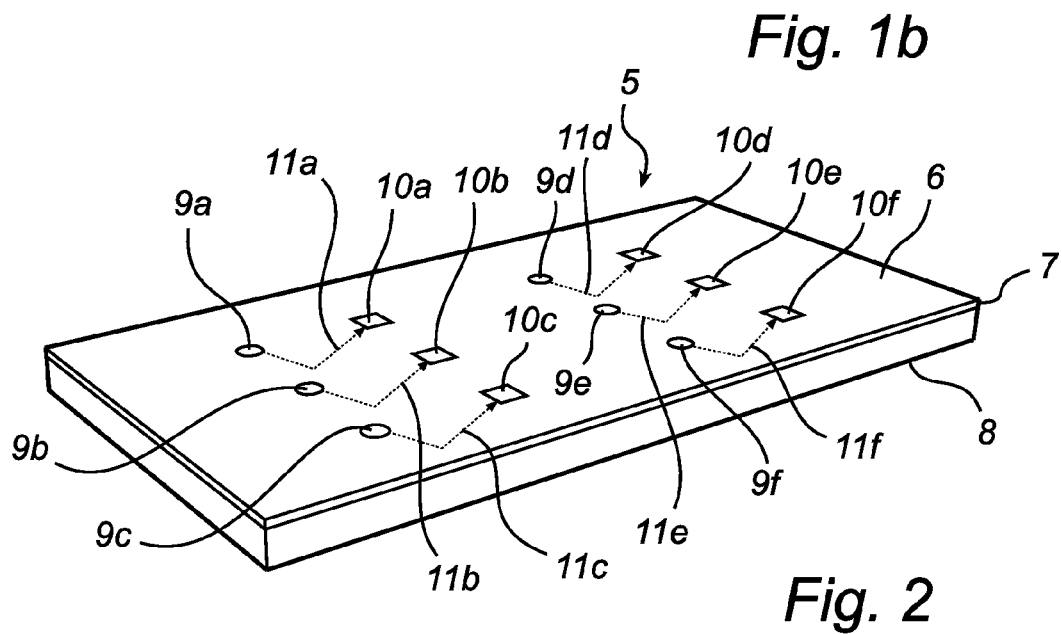
Fig. 2

SEMICONDUCTOR DEVICE WITH BACKSIDE TAMPER PROTECTION

TECHNICAL FIELD OF THE INVENTION

The present invention relates to a tamper-resistant semiconductor device including a plurality of electronic circuits formed on a circuitry side of a substrate having an opposite side which is a backside of the semiconductor device, the semiconductor device comprising at least one light-emitting device and at least one light-sensing device provided on the circuitry side of the semiconductor device.

TECHNICAL BACKGROUND

Security related integrated circuits (ICs) including secret information such as, for example, a secret key used for encryption or validation purposes, are typically equipped with anti-tamper structures for preventing unauthorized access of this secret information contained in the IC.

In U.S. Pat. No. 7,005,733 one such anti-tamper structure is disclosed according to which a light-source is positioned on the surface of an IC having a plurality of light sensors. The IC-light source assembly is encapsulated by a light-transmissive material having a plurality of randomly dispersed particles, and the encapsulation is surrounded by a outer covering which is light reflective on the inside and does not allow entry of light from the outside. When the IC-light source assembly is packaged in this manner, light emitted by the light source interacts with the dispersed particles and is reflected by the inside of the outer covering to form a characteristic interference pattern which is sensed by the light sensors. This characteristic pattern is used to produce a cryptographic key. When the package is tampered with so that the outer covering is perforated, some of the light will escape from the package and the interference pattern sensed by the detectors will be altered, and the key will thereby be changed.

A drawback of the anti-tamper structure disclosed in U.S. Pat. No. 7,005,733 is that it severely restricts the application range for the IC by requiring the IC to be surrounded by a transparent encapsulant which is enclosed by a reflective outer covering.

In particular, in order to protect the backside of the IC from being tampered with, the transparent encapsulant and reflective outer covering must surround the entire IC, which further restricts the application range by necessitating a package having connector pins surrounding the perimeter of the package.

Accordingly, there is a need for an improved tamper-protected semiconductor device which is suitable for a wider range of applications.

In particular, there is a need for providing a tamper-protected semiconductor device, that allows more flexibility in packaging and is therefore more cost-effective.

OBJECTS OF THE INVENTION

In view of the above-mentioned and other drawbacks of the prior art, a general object of the present invention is to provide an improved tamper-protected semiconductor device which is suitable for a wider range of applications.

A further object of the present invention is to provide a more cost-efficient tamper-protected semiconductor device.

SUMMARY OF THE INVENTION

According to the present invention, these and other objects are achieved through a tamper-resistant semiconductor device including a plurality of electronic circuits formed on a circuitry side of a substrate having an opposite side which is a backside of the semiconductor device. The semiconductor device comprises at least one light-emitting device and at least one light-sensing device. Both are provided on the circuitry side of the semiconductor device, i.e. at a surface of the semiconductor substrate. The light-emitting device is arranged to emit light into the substrate towards the backside. The light-sensing device is arranged to sense at least a fraction of the emitted light following passage through the substrate and reflection at the backside. The light-sensing device is moreover configured to output a signal indicative of a reflecting state of the backside. This enables detection of an attempt to tamper with the backside of the semiconductor device.

According to further aspects of the invention, methods for generation an identifier code and for verifying an identifier code are provided.

In an even further aspect of the invention, a semiconductor device with a specific light-emitting structure is provided.

The semiconductor device according to the present invention may be fabricated on a semiconductor substrate, such as, for example, Si, GaAs, SiGe, InP or SiC, or on an insulating substrate, such as glass.

The term "light" should be understood within the context of the present application to refer primarily to light of a wavelength for which the substrate is transparent. Therewith, it is intended to include infrared (IR) and ultraviolet (UV), as well as visible electromagnetic radiation. Different substrates are transparent to light of different wavelength ranges. For example, Si which has a band gap of about 1.12 eV is transparent to all light with a wavelength >1.07 µm.

The present invention is based upon the insight that tamper protection of a semiconductor device can be achieved by optically monitoring the backside of the semiconductor device from the inside of the device. Furthermore, the present inventor has realized that such an optical monitoring may be implemented by providing a light-emitting device and a light-sensing device on the circuitry side of the semiconductor device. The light-emitting device is arranged and configured to emit light which can penetrate the substrate and be reflected at the backside of the semiconductor device. The light-sensing device is arranged and configured to sense the light reflected at the backside of the semiconductor device. If the backside is somehow tampered with, the distribution of the light reflected there will change. This change will be sensed by the light-sensing device(s) whereby detection of backside tamper is enabled.

Suitably, means are provided such that the light-sensing device primarily senses light that has been reflected at the backside of the semiconductor device. Light traveling directly from the light-emitting device to the light-sensing device, for instance through the substrate, would reduce the sensitivity of the optical tamper detection. Such means are for instance light-blocking structures between the light-emitting and light-sensing devices. These light-blocking structures are defined to restrict the direct line-of-sight between the devices. Moreover, the location of the light-sensing device may be chosen so as to maximize its reception of reflected light.

Through the present invention, a semiconductor device can thus be equipped with a backside tamper protection which neither restricts the field of application of the semiconductor device, nor the choice of packaging of the device. Furthermore, the backside tamper protection capability of the semiconductor device according to the present invention can be implemented without the addition of any processing steps in the manufacturing of the semiconductor device.

Each of the light-emitting device and the light-sensing device may advantageously be comprised of at least one of the electronic circuits formed on the circuitry side of the semiconductor device. The light-emitting and light-sensing devices may be electronic circuits which are specifically designed for the respective purpose, or, alternatively, standard devices having light-emitting and/or light-sensing properties may be used. Examples of such devices which are primarily designed for other purposes include diodes and transistors, which are both typically capable of emitting and detecting light depending on their particular states.

Preferably, however, dedicated electronic circuits may be formed on the circuitry side of the semiconductor device as light-emitting and light-sensing devices, respectively. In the case of a silicon-based semiconductor device, such dedicated light-emitting devices, which can be manufactured in a standard process, for example, include various types of forward biased PN diodes, an NMOS transistor in forward bias, and a MOS transistor with a (deliberately) blown gate oxide, such as an anti-fuse. All of these light-emitting devices can be modulated, and the light pulse width may be short.

In a most suitable embodiment of a light emitting structure, a diode is defined in a circuit block between a p-type MOS-transistor (PMOST) and an n-type MOS transistor (NMOST). This diode is forward biased. The light emission is effected by shortly turning on the PMOST and the NMOST simultaneously. The period during which both PMOST and NMOST are turned out may be as short as 100 ps. As a result, a light pulse width below 100 ps is obtained. Such a pulse is evidently a short pulse, which ensures that optical deviations, as due to tampering, can be detected effectively. The provision of short pulses moreover reduces the level of background light, therewith improving the signal-to-noise ratio. It additionally allows the predictation within which time frame a light-sensing device should sense the incoming light if any. Evidently, a pulse of 10 ns is preferred over a pulse of 1 microsecond. An even shorter pulse, such as a pulse of 100 ps, is even better.

In an even further embodiment, the pn-junction of said diode between the PMOST and the NMOST is defined in a layer of polysilicon. The polysilicon layer is doped with p-type and n-type charge carriers to create a pn-junction. Since a silicide has been deliberately missed out over the pn-junction, the pn-junction functions as a diode. It turns out to be an efficient light source. The diode may be made in any semiconductor technology as desired, including 65 nm technology.

As dedicated light-detecting devices, structures which resemble pixels in a CMOS-image chip may advantageously be used. Such structures are effectively diodes. One example is for instance a n-type doped well in a p-type doped semiconductor substrate. This diode has a capacitance which is charged up prior to the light detection. When a photon is captured in the diode, the diode discharges. The remaining voltage over the diode is subsequently read out in a manner similar to read out of a memory cell, particularly a DRAM memory. This can be achieved by providing an amplifier transistor per a light-detecting structure. The diode voltage is used to control the amplifier transistor (f.i. the gate of a mosfet). This results in a current-based read-out, which can be compared to a reference current from a non-exposed light-detecting structure. Therewith, digitization of the signal is achieved.

Through the use of light-sensing and light-emitting devices, respectively, which are formed as electronic circuits on the circuitry side of the semiconductor device, no space-consuming and cost-driving chip-on-chip connections are required to achieve the desired backside tamper protection functionality.

Moreover, the light-emitting device may be arranged to emit light towards a backside portion being opposite to a circuitry side portion comprising a security critical electronic circuit, and the light-sensing device may be arranged to sense at least a fraction of the emitted light following reflection at this backside portion, thereby enabling detection of a tamper attempt directed at the security critical electronic circuit.

By arranging the light-emitting device and the light-sensing device in this manner, it is ensured that even a local tamper attempt targeted at a particularly security critical part of the semiconductor device can be detected.

For further increased security, a plurality of light-sensing devices, together with a single or several suitably arranged light-emitting devices, may be arranged around the security critical electronic circuit. Such a critical electronic circuit includes for instance memory cells with stored data and a decryption engine. The provision of a plurality of light-emitting devices and light-sensing devices ensures that a larger portion of the opposite backside is protected. Furthermore, sub-groups of light-sensing and light-detecting devices may be arranged to protect a plurality of corresponding security critical electronic circuits.

In response to a signal emitted by the light-sensing device indicating a change in the reflection state of the semiconductor device backside, the semiconductor device may be disabled by disabling circuitry which may be included in the semiconductor device. Such disabling may be made reversible or irreversible through, for example blowing a fuse.

Advantageously, the semiconductor device according to the present invention may further comprise a light-modifying structure. Such a structure is suitably provided on the backside of the substrate. It is configured to improve or modify the light reflection in any manner, such as, for example through scattering, focusing or patterning. Hereby, the reflection efficiency may be improved and/or information encoded in the reflection pattern.

Several light-modifying structures are envisaged within the scope of the invention. According to one embodiment, the light-modifying structure is formed by a light-focusing structure. This is in particular a diffraction-based optical element, such as a lens or a more advanced, pattern-generating diffractive element. Examples of such more advanced diffractive elements include multi-focus lenses and kinoforms, by which advanced patterns can be generated. By forming a diffractive lens on the backside, the reflected light from the light-emitting device(s) can be focused on the light-sensing device(s). Herewith the signal-to-noise ratio is improved. One suitable implementation of a diffractive element(s) comprises a plurality of grooves provided on or particularly in the backside. Such grooves may, for example, be fabricated by means of photolithography and etching, by laser ablation or by mechanically engraving. A detailed explanation and embodiment hereof is disclosed in WO2006/117765, which is included herein by reference. That application uses the grooves however for a completely different application. The provision of a diffractive lens additionally enables other implementation possibilities, to be discussed in further detail below.

According to another embodiment, the light-modifying structure is a light-scattering structure. A first example of such a structure is a substrate backside with a large surface roughness. This may be achieved, for example, through blasting or brushing of the substrate backside. In order to generate an unpredictable and thus tamper-resistant reflection, it is desired that the surface roughness varies across the backside of the substrate. Ideally, this variation is random. A second example of such a structure is a substrate backside onto which a layer with embedded particles is attached or deposited. Substances with embedded particles are known per se in the art of semiconductors, and particularly in the art of semiconductor packaging. Such an substance may be an adhesive, such as a glue in which reflective particles are suspended, or an adhesion film including such reflective particles, used for fixing the backside of the semiconductor device to a device carrier, or, when the device is mounted to a device carrier with the backside facing away from the device carrier, the substance may be a protective coating applied to the exposed side of the semiconductor device.

According to a further embodiment, the light-modifying structure comprises both a light-focusing structure and a light-scattering structure. This will create effect of opposite nature, leading to more unpredictability: where the lens is used to concentrate a light beam, the rough surface will produce a random component in the image cast in the light-detecting device.

As an advantageous example of the latter, the light-modifying structure may further be configured to encode secret information stored in the semiconductor device. In this case, tampering with the backside of the protected semiconductor device may not only be detected, but the semiconductor device may be rendered useless to the attacker, since the protected secret information, such as a secret key, is irreparably destroyed by the tampering.

As mentioned above, the use of light-modifying structures allows further implementation possibilities. Particularly, the light-modifying structure may be configured to encode secret information stored in or external to the semiconductor device. This storage of secret information allows a higher level of tampering protection, but it may also be used to define identifiers that are not merely based on software protocols. This kind of structures is generally referred to as a physically unclonable function (PUF).

The concept of a PUF is known per se. It allows a semiconductor device to measure a physical property which is unique to that semiconductor device. An essentially random number can be generated based on that property. This number is unique to each manufactured instance of the semiconductor device, despite nominally identical design and processing. One known embodiment of a PUF is a coating or package with inhomogeneously distributed particles and electrodes in local areas. Herewith the capacitance of the coating may be tracked, which capacitance turns out to across over the coating. An alternative implementation makes use of resistive particles that are distributed inhomogeneously. An even further implementation makes use of an inherent randomness in non-volatile memory cells during initialization. The present optical structure is deemed advantageous over the known structure in that it does not need additional coatings and in that the optical behavior is less sensitive to variations in temperature and other conditions than the capacitive or resistive behavior of a coating or layer.

As follows from the above description, a PUF-protected semiconductor device—also referred to as chip—generally makes use of a plurality of PUF elements. The value measured by the PUF is usually digitized and combined into a string of values which constitutes an identifier. This may be stored within the chip or be stored separately in a database external to the chip. Additional software-based security measures may be combined with a PUF-protection, such as hash-functions. Usually, a database external to the chip will send a set of instructions to the chip for reading a set of the PUF-elements in a specific order and under specific conditions. Directly after sensing the value of the PUF element, it is taken as a parameter of a more delicate function in an algorithm. This ensures that the output—for instance in the form of a value or a string of values—, which may be transmitted wirelessly, does not reveal information on the physical values of the PUF elements. Moreover, the function is defined such that no logic can be detected in the combination of the output and the (encrypted) set of instructions to the chip.

In a specific aspect of this invention, an optical implementation of a PUF is provided. Such a PUF is based on a combination of the following elements:

a plurality of light emitting and light detecting devices is provided diffractive elements may be provided on the backside of one chip or neighboring chips that lead to different reflection behavior;

moreover, complex diffractive elements may be provided to generate optically unexpected reflections; for instance, a predetermined set of point images may be generated from a single light emitting device; one example is a diffractive design that turns a parallel beam into three focal spots. Or a reflected beam propagates in a completely other direction that what is expected on the basis of the physical reflection laws (Snellius) for a planar surface.

The scattering structure may provide a randomness varying between neighboring chips produced from a single wafer and even across the backside of a single chip.

As will be understood, it is not necessary that all elements are present for the generation of the on-chip optical PUF of the invention. It is sufficient therefore to have a plurality of light-detecting structures and an unpredictable randomness inherent in the physical structure. As will be further understood, it is by no means necessary that the randomness is present within the backside of a single chip; it may be sufficient that there is randomness between chips manufactured as part of a single wafer.

BRIEF DESCRIPTION OF THE DRAWINGS

These and other aspects of the present invention will now be described in more detail, with reference to the appended drawings showing a currently preferred embodiment of the invention, wherein:

FIG. 1a is schematic illustration of an example of an application for the semiconductor device according to the present invention, in the form of a chip card;

FIG. 1b is an enlarged view of the semiconductor device comprised in the chip card in FIG. 1a;

FIG. 2 schematically illustrates the principle of the backside tamper protection of the semiconductor device according to the present invention;

FIG. 4b is a schematic representation of the diffraction-based lens in FIG. 4a.

DETAILED DESCRIPTION OF A PREFERRED EMBODIMENT OF THE INVENTION

Figure 3:
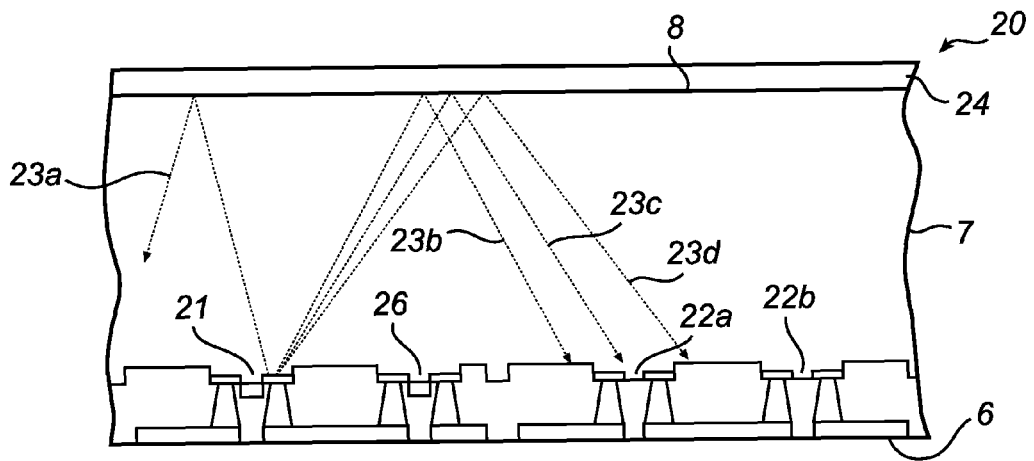
FIG. 3 is a schematic section view of a semiconductor device according to a first embodiment of the present invention.

In the following description, the present invention is described with reference to a security related semiconductor device having a plurality of light-emitting devices and light-sensing devices respectively, each of which is comprised of electronic circuits formed on the circuitry side of the semiconductor device. It should be noted that this by no means limits the scope of the invention, which is equally applicable to semiconductor devices having a single light-emitting device/light-sensing device pair, or any other configuration of these devices. Furthermore, the light-emitting and/or the light-sensing device may be provided on the circuitry side in any manner, including as separate devices through conventional chip-on-chip mounting techniques.

In FIG. 1a, an application example for the semiconductor device according to the present invention, in the form of a chip card 1, is schematically illustrated. The chip card 1 is shown with its chip side 2 facing up and its connector side 3 facing down, as is illustrated by the dotted outline of a connector structure 4 provided on the connector side 3. Embedded in the card 1 and connected to the connector structure 4 is a semiconductor device, here in the form of an integrated circuit (IC) 5, which is shown partly uncovered in FIG. 1b. As illustrated in FIG. 1b, the IC 5 is, according to the present example, wire bonded to the connector structure 4 and has its circuitry side 6 facing up and its backside facing the connector structure 4.

Chip cards 1 such as that illustrated in FIGS. 1a-b are typically used for secure storage of secret information, such as a card number, user identity information, a secret cryptographic key, biometrics-related information or the like. In order to prevent unauthorized access to such secret information, an IC 5 which is included in such a card 1 is generally tamper protected in some manner. Although several tamper protection arrangements for protecting the circuitry side 6 of the IC 5 are known, there is a need for satisfactory protection of the semiconductor device 5 from an attack through the backside of the semiconductor device 5.

Such backside tamper protection is provided through the semiconductor device according to the present invention, as will be described below in connection with FIGS. 2-7.

The principle of the backside tamper protection according to the present invention will first be described with reference to FIG. 2.

In FIG. 2, a semiconductor device 5 according to the present invention is shown, comprising a substrate 7 on which a plurality of electronic circuits have been formed on a circuitry side 6, the opposing side of the substrate 7 being the backside 8 of the semiconductor device 5.

As schematically illustrated in FIG. 2, a plurality of light-emitting devices 9a-f and a plurality of light-sensing devices 10a-f are provided on the circuitry side 6 of the semiconductor device 5. The light-emitting devices 9a-f are arranged to emit light into the substrate 7, towards the backside 8, where at least a portion of the emitted light is reflected, as indicated by the dotted arrows 11a-f, towards the light-sensing devices 10a-f. The amount of light reaching the respective light-sensing devices 10a-f depends on the reflecting state of the backside 8 of the semiconductor device 5. Any change in the reflecting properties of relevant portions of the backside 8 can thus be detected through signals output by the light-sensing devices 10a-f. Consequently, the present invention provides efficient protection against attacks launched on the backside 8 of the semiconductor device 5.

A semiconductor device according to a first embodiment of the present invention will now be described with reference to FIG. 3.

In FIG. 3, a schematic cross-section view of a semiconductor device 20 is shown where one light-emitting device 21 and two light-sensing devices 22a-b are formed by electronic circuits formed on the device side 6 of the semiconductor device 20. The light-emitting device 21 and the light-sensing devices 22a-b are arranged to flank a security critical device 26. The light-emitting device 21 is arranged to emit light, as indicated by the dotted arrows 23a-d into the substrate 7 towards a portion of the backside 8 of the semiconductor device 20 being opposite to the security critical device 26. The backside 8 is polished through a conventional substrate thinning procedure, and the light sensed by the light-sensing devices 22a-b is diffuse, as indicated by the arrows 23a-d. Although being diffuse, the internally reflected light 23a-d carries information indicative of the reflective state of the backside 8 of the semiconductor device in terms of the amount of light impinging on the respective light-sensing devices 22a-b. If any substance 24 adjacent to the backside would be removed and/or the backside 8 scratched, further thinned or influenced in practically any other way, the distribution of the reflected light 23a-d would be influenced, indicating an attack through the backside 8 being in progress. In response to such an indication, the semiconductor device 20 may be disabled, making it impossible for an attacker to gain access to the secret information kept within the semiconductor device 20.

As will be discussed below in connection with FIGS. 4a-7, a light-modifying structure may be provided on the backside of the semiconductor device and configured such that the reflection at the backside results in a reflection pattern which is determined by the light-modifying structure. Hereby, the security may be further increased.

Figure 4A:
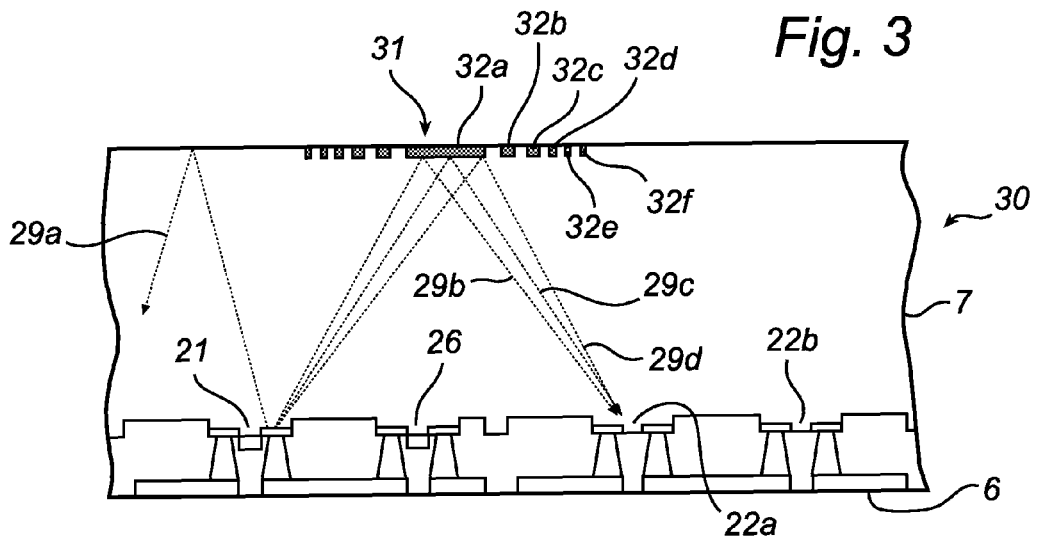
FIG. 4a is a schematic section view of a first example of a semiconductor device according to a second embodiment of the present invention, comprising a diffraction-based lens having a single focal point.
Figure 4B:
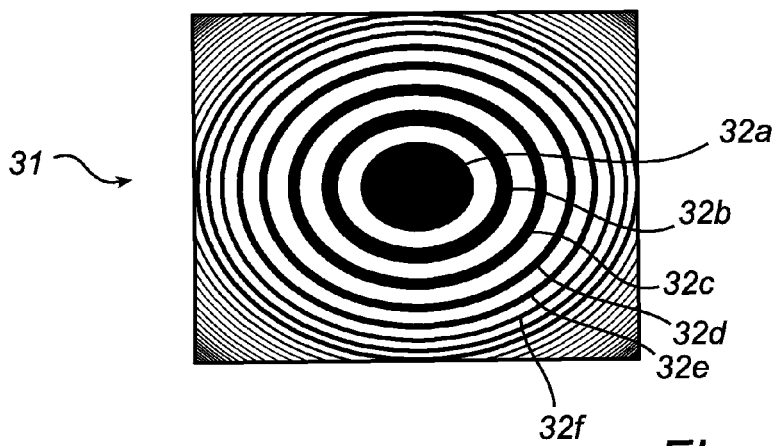

In FIG. 4a, which schematically illustrates a first example of a semiconductor device according to a second embodiment of the present invention, a semiconductor device 30 is shown, which differs from that shown in FIG. 3 in that a light-modifying structure in the form of an elliptical diffraction-based lens 31 capable of focusing light from a first point to a second point (the two foci of the ellipse) is provided on the backside 8 of the semiconductor device 30. Through the diffractive lens 31, light from a light-emitting device 21 may be focused on a corresponding light-sensing device 22a, as illustrated by the dotted arrows 29a-d, whereby the signal-to-noise ratio of the tamper protection arrangement is improved. The diffractive lens 31, may, as is further illustrated by FIG. 4b, be provided in the form of a pattern of concentric elliptical grooves 32a-f on the backside 8. These grooves may, for example, be formed using photolithography and may be used to achieve different backside reflection patterns for different individual semiconductor devices 30. For example, the position and/or focal point(s) of the diffractive lens 31 may be different for different semiconductor devices 30, and, advantageously, a portion of the secret information stored in the semiconductor device 30 may be encoded by these or other properties of the diffractive lens 31.

A second example of a semiconductor device according to the second embodiment of the present invention will now be described with reference to FIG. 5, which is a schematic section view of a semiconductor device 40 which differs from the semiconductor described above in connection with FIGS. 4a-b in that the light-modifying structure 41 is formed by a multi-focal diffraction-based optical element, by which light emitted by one light-emitting device 21 can be focused, following reflection at the backside 8 of the semiconductor device 40, onto multiple light-sensing devices 22a-b, as illustrated by the dotted arrows 41a-c and 42a-c, respectively. By implementing the light-modifying structure as such a more complex diffraction-based optical element 41, more information can be encoded in the reflection pattern of the backside 8, whereby the formation of a device-specific reflection pattern is facilitated.

According to a third embodiment of the present invention, the light-modifying structure provided on the backside of the semiconductor device may be formed by a device-specific scattering structure. Two examples of this third embodiment will be described below with reference to FIGS. 6 and 7, respectively.

Figure 5:
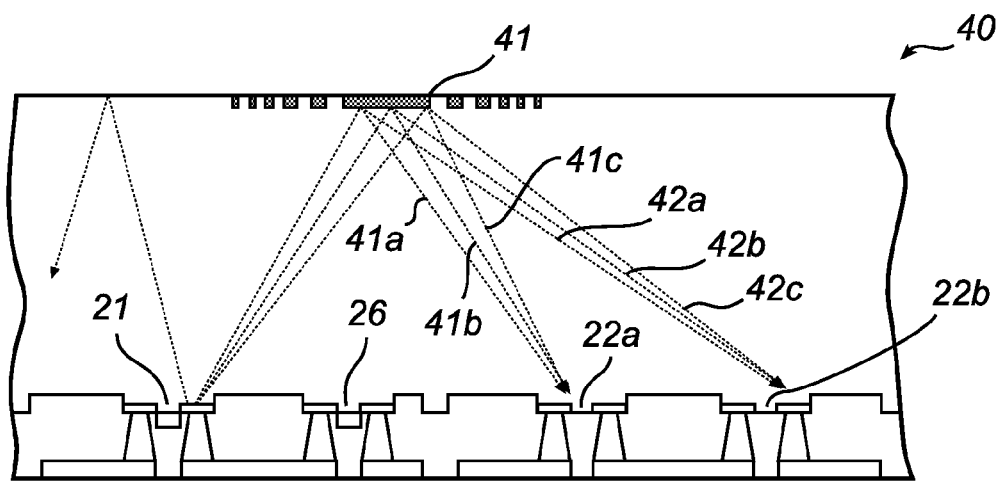
FIG. 5 is a schematic section view of second example of a semiconductor device according to the second embodiment of the present invention, comprising a diffraction-based lens having multiple focal points.
Figure 6:
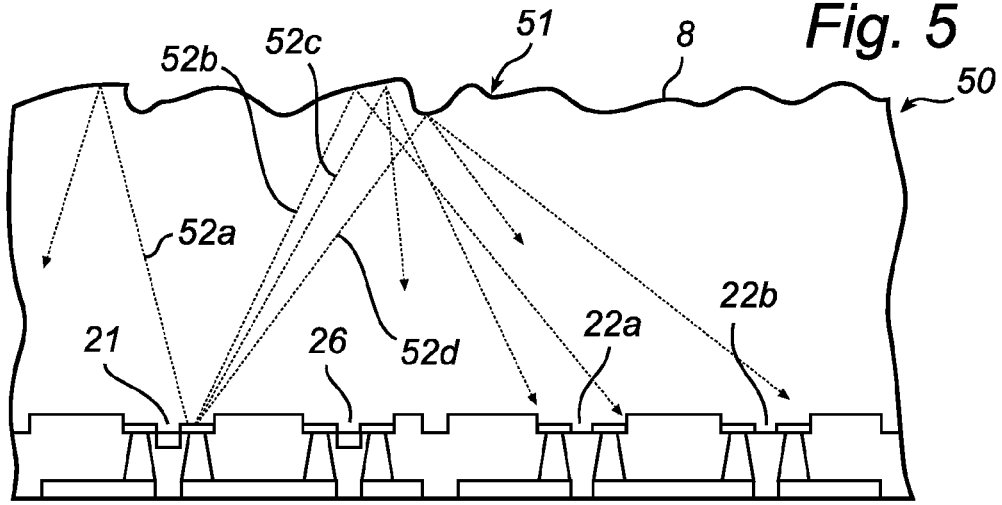
FIG. 6 is a schematic section view of first example of a semiconductor device according to a third embodiment of the present invention, comprising a device-specific scattering structure in the form of a surface roughness of the backside of the semiconductor device.

In FIG. 6, which schematically illustrates a first example of a semiconductor device according to the third embodiment of the present invention, a cross-section of a semiconductor device 50 is shown, which differs from the previously described semiconductor devices of FIGS. 4a and 5 in that the light-modifying structure is provided in the form of a device-specific surface roughness 51 of the backside 8 of the semiconductor device 50. The device-specific surface roughness may be formed randomly through, for example, blasting or etching, or macroscopically ordered, such as through, for example, patterning through engraving or laser ablation in a pattern which yields device specific scattering structures for each of the semiconductor devices 50 comprised in a panel. As indicated by the dotted arrows 52a-d, which represent light emitted by a light-emitting device 21 following internal reflection against the backside 8 of the semiconductor device 50, such a surface roughness 51 results in a device-specific reflection pattern which will be altered by any modification of the backside 8. As a production step following the provision of the device-specific light-modifying structure 51, the reflection pattern of each individual semiconductor device 50 may be detected and, optionally, used to encode a portion of the secret information contained in the semiconductor device 50.

Figure 7:
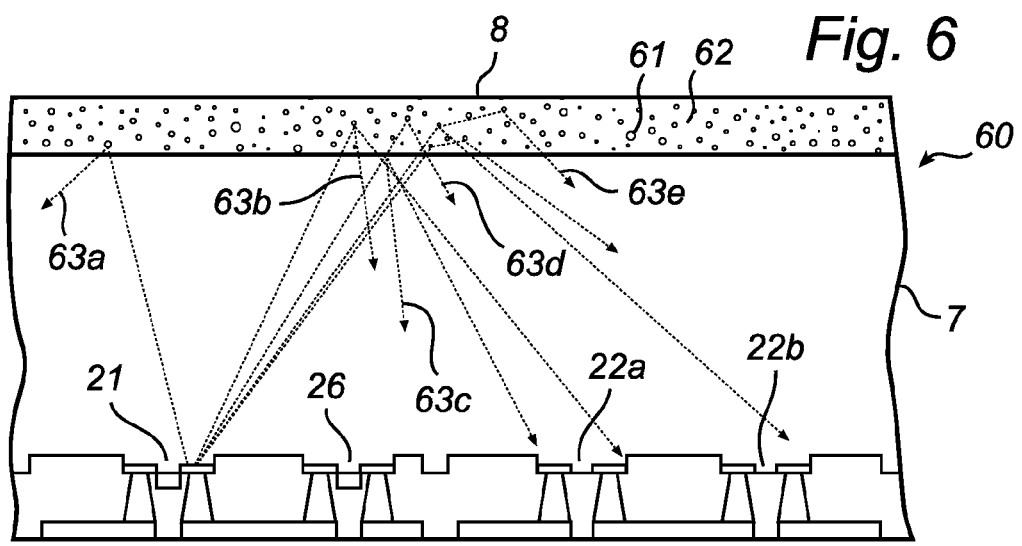
FIG. 7 is a schematic section view of second example of a semiconductor device according to a third embodiment of the present invention, comprising a device-specific scattering structure in the form of reflective particles included in a substance applied adjacent to the backside of the semiconductor device.

According to a second example of such a semiconductor device 60, the device-specific scattering structure may, as schematically illustrated in FIG. 7, comprises a plurality of reflective particles 61 included in a substance 62 applied adjacent to the backside 8 of the semiconductor device 60. This substance 62 may, for example, be a die-attaching adhesive having reflective particles suspended therein, or a device coating which includes particles or other irregularities which are practically randomly distributed and capable of scattering light. As indicated by the dotted arrows 63a-e, which represent selected fractions of the light emitted by a light-emitting device 21, following reflection at the backside 8 against reflective particles 61 suspended in the substance 62 applied adjacent to the backside 8. Through this scattered reflection against the practically randomly dispersed reflective particles 61, a device-specific reflection pattern is generated, which may, as described above in connection with FIG. 6, be used to encode a portion of the secret information stored in the semiconductor device 60.

The person skilled in the art realizes that the present invention by no means is limited to the preferred embodiments. For example, the semiconductor device may comprise several security critical electronic circuits, which may each be protected from backside tamper by suitably arranged light-emitting and light-sensing devices.

Furthermore, light-emitting and light-sensing devices may be distributed across the circuitry side of the semiconductor device such that the entire backside is protected against localized tamper attempts.

Additionally, the semiconductor device according to the present invention may be provided in any kind of packaging solution, in which the backside of the semiconductor device is facing a device carrier, such as in the case of wire-bonding or TAB-bonding, or facing away from the device carrier, such as in the case of flip-chip connection.

Moreover, although no specific circuitry side tamper protection arrangement is described herein, the skilled person realizes that there are a large number of circuitry side, or front side, tamper protection arrangements known in the art which are applicable to the semiconductor device according to the present invention, including, for example, the provision of a tamper detection grid or meander pattern provided in the top metal layer(s) of the semiconductor device.

The invention claimed is:

1. A tamper-resistant semiconductor device including a plurality of electronic circuits formed on a circuitry side of a substrate having an opposite side which is a backside of the semiconductor device, said semiconductor device comprising:
    at least one light-emitting device and at least one light-sensing device provided on said circuitry side of the semiconductor device;
characterized in that
    said light-emitting device is arranged to emit light, including a wavelength range for which said substrate is transparent, into the substrate towards said backside; and
    said light-sensing device is arranged to sense at least a fraction of said emitted light following passage through said substrate and reflection at said backside, and configured to output a signal indicative of a reflecting state of said backside, thereby enabling detection of an attempt to tamper with the backside of the semiconductor device.

2. A semiconductor device according to claim 1, wherein each of said light-emitting device and said light-sensing device is comprised of at least one of said electronic circuits formed on said circuitry side of the semiconductor device.

3. A semiconductor device according to claim 1, wherein:
    said light-emitting device is arranged to emit light towards a backside portion being opposite to a circuitry side portion comprising a security critical electronic circuit; and
    said light-sensing device is arranged to sense at least a fraction of said light following reflection at said backside portion, thereby enabling detection of a tamper attempt directed at said security critical electronic circuit.

4. A semiconductor device according to claim 1, further comprising disabling circuitry configured to disable said semiconductor device in response to a change in said signal from the light-sensing device.

5. A semiconductor device according to claim 1, further comprising a light-modifying structure provided on said backside and configured such that said reflection at said backside results in a reflection pattern determined by said light-modifying structure.

6. A semiconductor device according to claim 5, wherein said light-modifying structure is further configured to encode secret information stored in said semiconductor device.

7. A semiconductor device according to claim 5, wherein said light-modifying structure is formed by a diffraction-based optical element.

8. A semiconductor device according to claim 7, wherein said diffraction-based optical element comprises a plurality of grooves provided on said backside.

9. A semiconductor device according to claim 5, wherein said light-modifying structure is formed by a device-specific scattering structure.

10. A semiconductor device according to claim 9, wherein said device-specific scattering structure comprises a device-specific surface roughness of said backside.

11. A semiconductor device according to claim 9 wherein said device-specific scattering structure comprises a plurality of reflective particles included in a substance applied adjacent to the backside of said semiconductor device.

12. A semiconductor device according to claim 1, further comprising a circuitry side tamper structure for protecting said semiconductor device against attacks from said circuitry side of the semiconductor device.

13. Use of the semiconductor device of claim 1 for the generation of an identifier code by:
sensing light received in one or more of the light-sensing devices upon light emission by one or more of the light-emitting devices in a predefined order to obtain electric signals;
transforming the electric signals into the identifier code, and
storing the identifier code in a memory.

14. Use of the semiconductor device of claim 1 for the verification of the identity or authenticity of the semiconductor device, by:
sensing light received in one or more of the light-sensing devices upon light emission by one or more of the light-emitting devices in a predefined order to obtain electric signals;
transforming the electric signals into an identifier code,
reading a corresponding identifier code from a memory, and
comparing the sensed identifier code with the read identifier code to verify the identity or authenticity of the semiconductor device.

15. A semiconductor device comprising a substrate and a light-emitting device structure for emitting light into the substrate, said light-emitting device structures constituted by a forward biased diode defined between a n-type MOS transistor and a p-type MOS transistor, wherein the diode is defined in a layer of polysilicon that is doped in a first region by n-type charge carriers and in a second region by p-type charge carriers, which first and second region define a junction.

16. A semiconductor device as claimed in claim 15, wherein the polysilicon is covered with a silicide except in an area overlying the junction.

17. A semiconductor device as claimed in claim 15, wherein the n-type MOS transistor and the p-type MOS transistor are connected between the supply voltage and ground.

18. A semiconductor device, comprising:
a plurality of electronic circuits on a circuitry side of a substrate having an opposite side which is a backside of the semiconductor device;
at least one light-emitting device and at least one light-sensing device provided on the circuitry side of the semiconductor device;
wherein the light-emitting device is configured and arranged to emit light, including a wavelength range for which said substrate is transparent, into the substrate towards said backside, and the light-sensing device is configured and arranged to sense at least a fraction of said emitted light following passage through said substrate and reflection at the backside, and configured to output a signal indicative of a reflecting state of said backside, and therein enabling detection of an attempt to tamper with the backside of the semiconductor device.

* * * * *